United States Patent
Beauvais et al.

(10) Patent No.: US 9,069,958 B2
(45) Date of Patent: Jun. 30, 2015

(54) CREATING AND MAINTAINING A SECURITY POLICY

(75) Inventors: Daniel J. Beauvais, Kitty Hawk, NC (US); Lawrence C. Ross, Jr., Greensboro, NC (US); Aria Zandi, New Carlisle, IN (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 13/246,930

(22) Filed: Sep. 28, 2011

(65) Prior Publication Data

US 2013/0081102 A1    Mar. 28, 2013

(51) Int. Cl.
*G06F 17/00* (2006.01)
*G06F 21/55* (2013.01)
*H04L 29/06* (2006.01)

(52) U.S. Cl.
CPC ........... *G06F 21/552* (2013.01); *H04L 63/0227* (2013.01); *H04L 63/0263* (2013.01)

(58) Field of Classification Search
CPC ............ H04L 63/0263; H04L 63/0227; G06F 15/177
USPC .............................................................. 726/1
See application file for complete search history.

(56) References Cited

U.S. PATENT DOCUMENTS

| | | | |
|---|---|---|---|
| 5,854,932 A * | 12/1998 | Mariani et al. | 717/116 |
| 7,103,874 B2 * | 9/2006 | McCollum et al. | 717/121 |
| 7,146,639 B2 | 12/2006 | Bartal et al. | |
| 7,200,865 B1 | 4/2007 | Roscoe et al. | |
| 2002/0184525 A1 | 12/2002 | Cheng | |
| 2003/0046583 A1 | 3/2003 | Goldman et al. | |
| 2003/0154404 A1 | 8/2003 | Beadles et al. | |
| 2005/0262554 A1 * | 11/2005 | Brooks et al. | 726/11 |
| 2008/0282335 A1 * | 11/2008 | Abzarian et al. | 726/11 |
| 2009/0113386 A1 * | 4/2009 | Eker et al. | 717/108 |

OTHER PUBLICATIONS

Bartal et al., Firmato: A Novel Firewall Management Toolkit, 2004, Retrieved from the Internet <URL: dl.acm.org/citation.cfm?id=1035583>, pp. 1-40 as printed.*

(Continued)

*Primary Examiner* — Michael Chao
(74) *Attorney, Agent, or Firm* — Schmeiser, Olsen & Watts; Lisa J. Ulrich

(57) ABSTRACT

An approach for managing a security policy is provided. First, second, and third specification sets are received after being independently generated by different practitioners. The first specification set maps service-to-service communications. The second specification set maps the services to devices on which the services are placed. The third specification set maps the devices to one or more network addresses. The received specification sets are algorithmically combined to create packet filtering rule statements. The security policy is generated as packet filtering rules based on the combined specification sets and the packet filtering rule statements. An application deployment modification includes independently editing specification set(s) that are affected by the modification, without knowledge of specification set(s) that are unaffected by the modification. An updated security policy may be generated by an incremental update to an existing security policy without requiring replacement of the entire security policy.

9 Claims, 4 Drawing Sheets

(56) References Cited

OTHER PUBLICATIONS

Cuppens et al., A Formal Approach to Specify and Deploy a Network Security Policy, 1999, Retrieved from the Internet URL: ieeexplore.ieee.org/xpls/abs_all.jsp?arnumber=766714>, pp. 1-16 as printed.*

Iyer et al.; Model management decision environment: a Web service prototype for spreadsheet models; 2004; Retrieved from the Internet <URL: sciencedirect.com/science/article/pii/S016792360400034X#>; pp. 1-22 as printed.*

Senin et al.; Distributed modeling and optimization of mixed variable design problems; 1999; Retrieved from the Internet <URL: cadlab.mit.edu/publications/99-senin-tr9901-dome/dontindex/99-senin-tr9901.pdf>; pp. 1-32 as printed.*

No stated author; Permitting or Denying Network Access; Cisco; 2005; Retrieved from the Internet <URL: .cisco.com/c/en/us/td/docs/security/asa/asa82/configuration/guide/config/access_nw.html>; pp. 1-8 as printed.*

Bartal et al., Firmato: A Novel Firewall Management Toolkit, Bell Labs, Lucent Technologies, 15 pages.

Hassan et al., A Framework for Translating A High Level Security Policy Into Low Level Security Mechanisms, Journal of Electrical Engineering, vol. 61, No. 1, 2010, pp. 20-28.

* cited by examiner

CREATING AND MAINTAINING A SECURITY POLICY

TECHNICAL FIELD

The present invention relates to a data processing method and system for managing a security policy, and more particularly to a data processing technique for creating and maintaining end-to-end packet filtering rules in a security policy.

BACKGROUND

Packet filtering rules are a collection of rule statements written in a dense language. Each rule statement specifies permissions for a particular network connection across a packet filtering device. Each rule statement includes a network address for the source of a packet, another network address for the destination of the packet, a protocol specification, a port specification, and an action, such as permit or deny the communication of the packet. A rule statement compacts a significant amount of information into a concise statement, which must be exact.

BRIEF SUMMARY

Embodiments of the present invention provide a method of managing a security policy. The method comprises:

A computer receiving a first specification set, a second specification set and a third specification set, wherein the first specification set maps each service of a first set of services to a corresponding service of a second set of services based on each service of the first set of services requiring communication with the corresponding service of the second set of services, wherein the first and second set of services are included in a plurality of services, wherein the second specification set maps each service of the plurality of services to one or more corresponding devices of a plurality of devices, and wherein the third specification set maps each device of the plurality of devices to one or more network addresses;

The computer combining the received first, second and third specification sets by mapping the first, second and third specification sets to a plurality of packet filtering rule statements; and A processor of the computer generating the security policy as a plurality of packet filtering rules based on the combined first, second and third specification sets and the plurality of packet filtering rule statements, wherein each packet filtering rule of the plurality of packet filtering rules specifies a corresponding source network address or range of source network addresses, a corresponding destination network address or range of destination network addresses, a corresponding port or range of ports, a corresponding protocol and a corresponding action.

In one aspect of the present invention, the first, second, and third specification sets are received in the aforementioned method after being independently generated by different practitioners.

In one aspect of the present invention, after the security policy is generated in the aforementioned method, the security policy may be maintained by determining an application deployment modification and independently editing the specification set(s) that are affected by the application deployment modification, and without knowledge of specification set(s) that are unaffected by the application deployment modification.

A system, program product and a process for supporting computing infrastructure where the process provides at least one support service are also described herein, where the system, program product and process for supporting computing infrastructure correspond to the aforementioned method.

Embodiments of the present invention provide distinct sub-tasks for developing packet filtering rules, which yield simple and highly independent specification sets that can be individually edited and maintained, and can be automatically combined to form a complete security policy with consistently higher quality and lower cost than existing manual processes. Furthermore, the independent specification sets provide modularity and resilience that allow network traffic flow specifications to remain stable in response to a change in a network address of a device, a redistribution of services on devices, or a change in the number of instantiations of a service. The modularity of the specification sets provides simple and direct production of delta sets, which support incremental additions, deletions and/or updates to an existing security policy without requiring replacement of the entire security policy.

DETAILED DESCRIPTION

Overview

Figure 1:
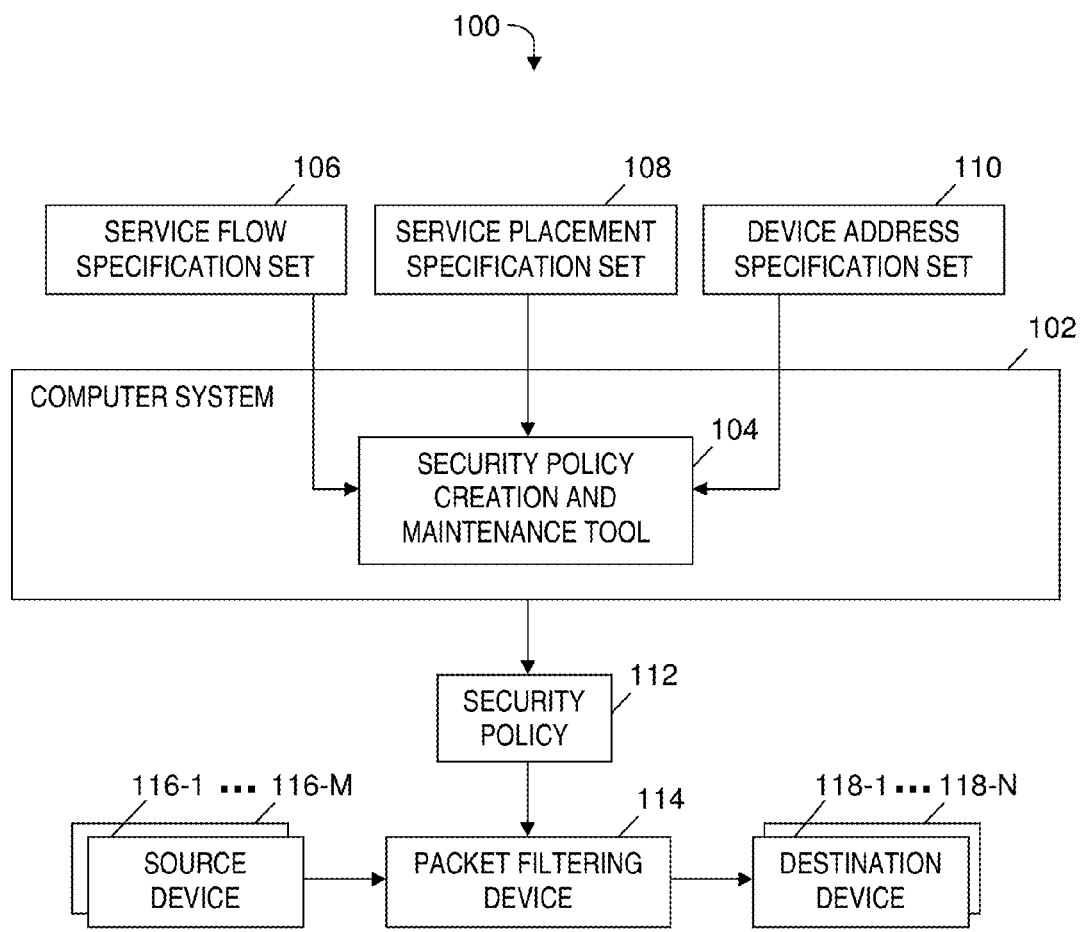
FIG. 1 is a block diagram of a system for managing a security policy, in accordance with embodiments of the present invention.

The present invention recognizes that known methods for managing packet filtering rules include a single practitioner manually writing and/or manually editing firewall rules to meet a given business requirement, which is a complex and error-prone task. The present invention also recognizes that known methods of deploying an installed system at another location require a tedious and error-prone reviewing of all rule statements to determine what manual editing is necessary for the deployment at the other location. The present invention further recognizes that a designer thinks in terms of service names and data flow names, rather than in terms of network addresses and port numbers required in packet filtering rule statements; therefore, an error in a low-level packet filtering rule statement, such as transposed digits, is extremely difficult to detect.

Embodiments of the present invention may provide a method and system for managing a security policy, which includes a simplified technique for creating and maintaining packet filtering rules included in the security policy. In one embodiment, the security policy being managed by the embodiments presented herein is an end-to-end or enterprise security policy provided for multiple packet filtering devices. The known complex and error prone task of developing packet filtering rules may be divided into new, less complex, and distinct sub-tasks that are performed by multiple corresponding practitioners. Each of the multiple practitioners (e.g., designers) can work on completing the sub-tasks independently of the others, thereby limiting the scope of any necessary modifications and supporting a higher level of verification. Completing the packet filtering rule development sub-tasks results in high-level specification sets that can be independently edited and maintained. A computer automatically combines the specification sets to form a computer network traffic security policy by mapping the high-level specification sets to detailed, complex packet filtering rule statements. Each resulting packet filtering rule statement is expressed in terms of numbers that specify a source network address or a range of source network addresses, a destination network address or a range of destination network addresses, a protocol specification, a port or a range of ports, and an action such as permit or deny the communication of a packet via a packet filtering device.

Based on the complex packet filtering rule statements mapped to the combined specification sets, packet filtering rules are modified in, added to, and/or deleted from an existing security policy to generate either a delta set of packet filtering rules that includes only updates to the existing security policy or that includes an updated version of the entire security policy, where the updated version replaces the entire existing security policy. The delta set may be used to update the existing security policy without replacing the entire existing security policy.

Embodiments of the present invention may allow people and machines to do what each does best. That is, human system designers are allowed to generate high-level specifications of packet filtering rules in terms of high-level concepts related to requirements for control of network traffic, while a computer process handles the mapping of the high-level specifications to detailed packet filtering rule statements expressed in terms of numbers.

A system designer conceptualizes the network traffic flows in terms of opening paths between services, but packet filtering rules are written in terms of the network addresses of the devices on which the services are deployed. A single services-level flow may generate many specific rules in a typical distributed deployment, where the services are instantiated on multiple devices in order to provide redundancy and capacity. Embodiments of the present invention may allow one practitioner to specify what services need to communicate with other services, while another practitioner specifies the devices on which the services are placed, and yet another practitioner specifies network addresses of the devices. The security policy creation and maintenance tool disclosed herein may combine each service flow specification with service distribution specifications, and with device address specifications, thereby generating packet filtering rules written in terms of network addresses, ports, protocols and actions. The generated packet filtering rules specify a security policy used to filter packets sent between computer devices, where there is a many-to-many relationship between computer devices that are a source of the packets and computer devices that are a destination of the packets.

System for Managing a Security Policy

FIG. 1 is a block diagram of a system for managing a security policy, in accordance with embodiments of the present invention. System 100 includes a computer system 102, which runs a software-based security policy creation and maintenance tool 104. Security policy creation and maintenance tool 104 receives first, second and third specifications sets, which are a service flow specification set 106, a service placement specification set 108, and a device address specification set 110, respectively.

Service flow specification set 106 maps each service of a first set of services to a corresponding service of a second set of services based on each service of the first set of services requiring communication with the corresponding service of the second set of services. A plurality of services consists of the first and second set of services. Service placement specification set 108 maps each service of the plurality of services to one or more corresponding devices of a plurality of devices. Device address specification set 110 maps each device of the plurality of devices to one or more network addresses.

Tool 104 automatically maps the specification sets 106, 108, 110 to a plurality of packet filtering rule statements. Tool 104 generates a security policy 112 (a.k.a. a collection of packet filtering rules). A packet filtering device 114 (e.g., a firewall) in system 100 receives security policy 112 and uses the security policy 112 to filter packets being sent from one or more source computer devices 116-1 . . . 116-M to one or more destination computer devices 118-1 . . . 118-N, where M≥1 and N≥1). In one embodiment, source device(s) 116-1 . . . 116-M and destination device(s) 118-1 . . . 118-N are computer systems communicating with each other via a computer network.

In another embodiment, system 100 may include multiple packet filtering devices, and tool 104 may provide a security policy across the multiple packet filtering devices. For example, an enterprise or application may have multiple firewalls that are supported by tool 104.

Computer system 102 may include hardware and software components, which are described below relative to FIG. 4.

The functionality of the components of system 100 is further described below relative to FIG. 2, FIG. 3 and FIG. 4.

Process for Creating a Security Policy

Figure 2:
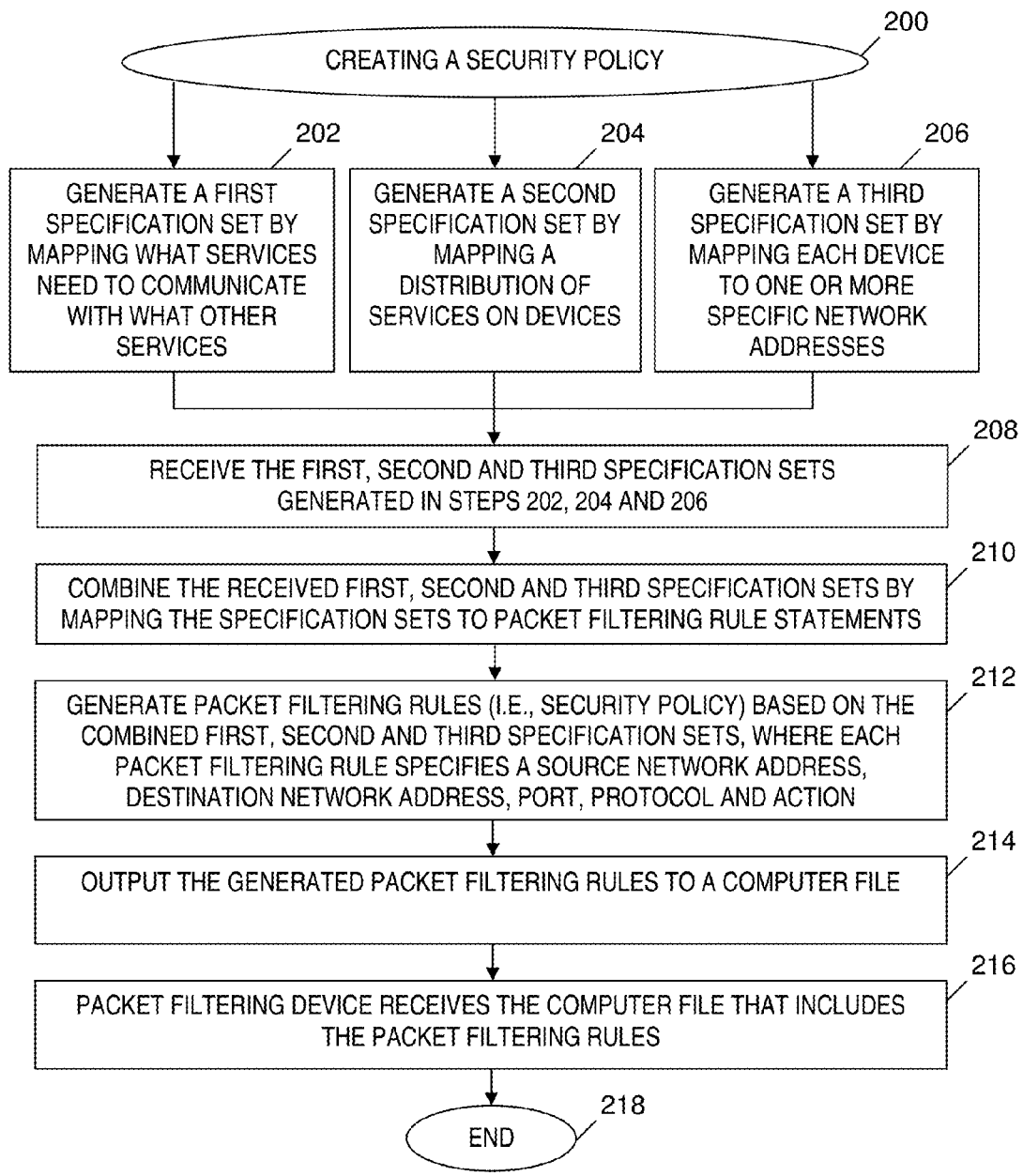
FIG. 2 is a flowchart of a process that includes creating a security policy, where the process is implemented in the system of FIG. 1, in accordance with embodiments of the present invention.

FIG. 2 is a flowchart of a process that includes creating a security policy, where the process is implemented in the system of FIG. 1, in accordance with embodiments of the present invention. The process of creating a security policy starts at step 200. Steps 202, 204 and 206 may be performed in any order. Further, two or more of the steps 202, 204 and 206 may be performed in parallel or partly in parallel.

Steps 202, 204 and 206 provide modularity by allowing the compartmentalization of the sub-tasks of developing independent specification sets 106, 108, 110 (see FIG. 1). Because of the compartmentalization, different practitioners, without overlap, may develop the independent specification sets. In one embodiment, each of the specification sets 106, 108, 110 (see FIG. 1) is defined and managed by a different person. By separating the sub-tasks, interdependencies are reduced, which enables more thorough verification. Division into independent specification sets reduces the risk of unintentional change, which may not be discovered and corrected until much later in the process and at a greater cost.

In step 202, a practitioner generates service flow specification set 106 (see FIG. 1) by mapping what services of the plurality of services need to communicate with what other services of the plurality of services.

In step 204, a practitioner generates service placement specification set 108 (see FIG. 1) by mapping a distribution of the plurality of services onto the plurality of devices, where each service may be mapped to one or more devices.

In step 206, a practitioner generates device address specification set 110 by mapping each device of the plurality of devices to one or more corresponding specific network addresses.

In one embodiment, the practitioners performing steps 202, 204 and 206 are first, second and third practitioners who are three different users of system 100 (see FIG. 1). In another embodiment, a first practitioner performs exactly two of the steps 202, 204 and 206 and a second practitioner who is different from the first practitioner performs the other step of the steps 202, 204 and 206. In yet another embodiment, the same practitioner performs all three of the steps 202, 204 and 206.

As one example, steps 202, 204 and 206 may generate and store the specification sets in a worksheet provided by a spreadsheet program. In one embodiment, steps 202, 204 and 206 generate the specification sets by populating simple tables and do not require any proficiency in writing specifications in a model definition language (e.g., a language for defining an instance of an entity-relationship model).

After all of steps 202, 204 and 206 are completed, then step 208 is performed. In step 208, security policy creation and maintenance tool 104 (see FIG. 1) receives the specification sets generated in steps 202, 204 and 206.

In step 210, tool 104 (see FIG. 1) combines service flow specification set 106 (see FIG. 1), service placement specification set 108 (see FIG. 1), and device address specification set 110 (see FIG. 1) by mapping the aforementioned specification sets to packet filtering rule statements.

In step 212, tool 104 (see FIG. 1) automatically generates packet filtering rules (i.e., security policy 112 in FIG. 1) based on the combined specification sets 106, 108 and 110 (see FIG. 1) and the aforementioned packet filtering rule statements. Each packet filtering rule of the generated packet filtering rules specifies a source network address or a range of source network addresses, a destination network address or a range of destination network addresses, a port or a range of ports, a protocol, and an action, such as permit or deny the sending of a packet from a source device of source device(s) 116-1 ... 116-M (see FIG. 1) to a destination device of destination device(s) 118-1 ... 118-N (see FIG. 1) via packet filtering device 114 (see FIG. 1). The process of creating a security policy ends after step 212.

In step 214, tool 104 (see FIG. 1) outputs to a computer file the packet filtering rules generated in step 212. In one embodiment, subsequent to step 214 and prior to step 216, a person receives the computer file that includes the packet filtering rules (e.g., by manually receiving a storage device that stores the computer file or by receiving an email), and the person subsequently inputs the computer file to packet filtering device 114 (see FIG. 1). In another embodiment, subsequent to step 214 and prior to step 216, tool 104 (see FIG. 1) automatically sends the computer file that includes the packet filtering rules to packet filtering device 114 (see FIG. 1).

In step 216, packet filtering device 114 (see FIG. 1) receives the packet filtering rules and subsequently may use the received packet filtering rules to filter packets sent by the source device referenced in step 212 to the destination device referenced in step 212. After step 216, the implementation of the security policy is complete.

In step 218, the process of FIG. 2 ends.

Process for Maintaining a Security Policy

Figure 3:
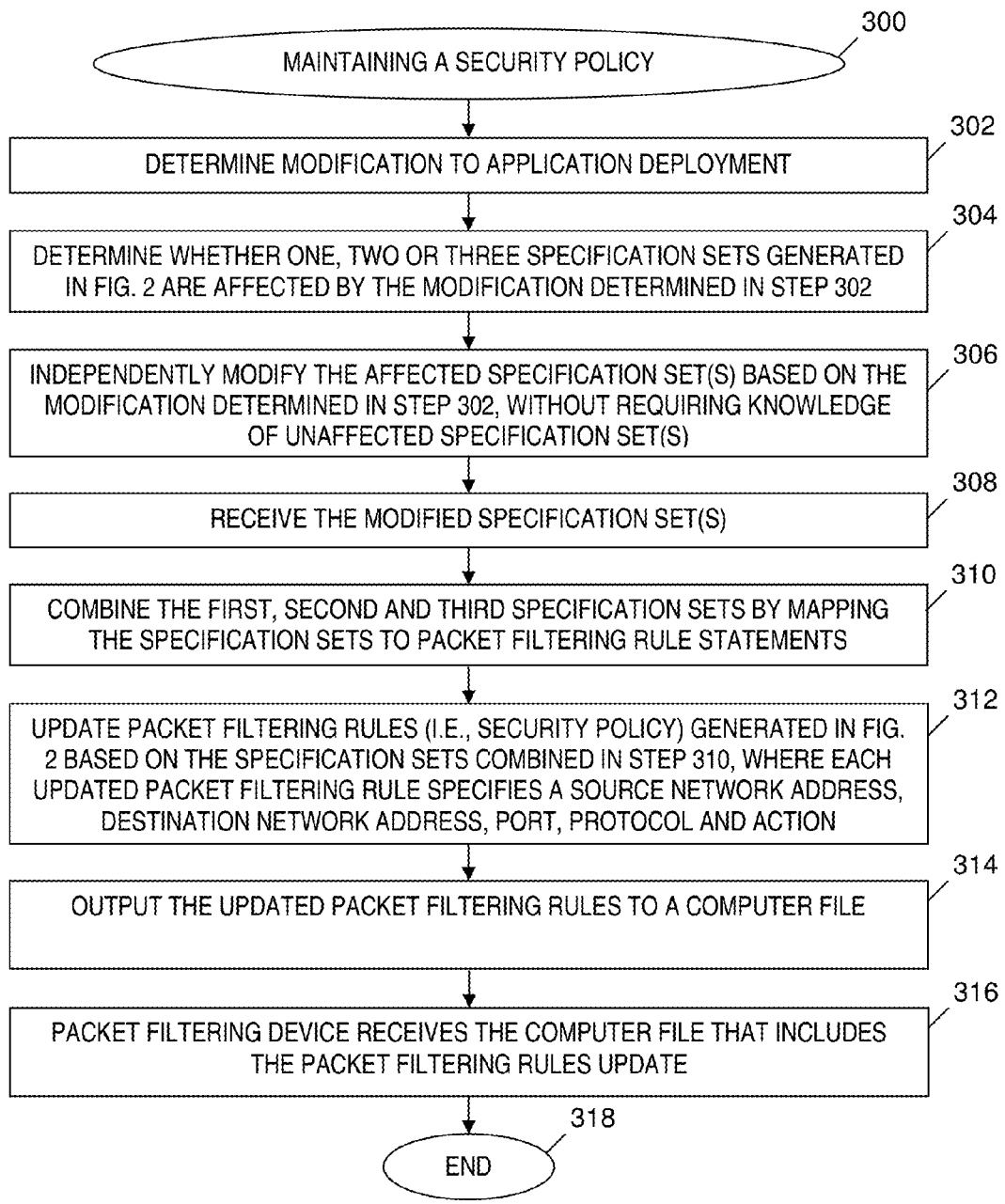
FIG. 3 is a flowchart of a process of maintaining a security policy, where the process is implemented in the system of FIG. 1, in accordance with embodiments of the present invention.

FIG. 3 is a flowchart of a process of maintaining a security policy, where the process is implemented in the system of FIG. 1, in accordance with embodiments of the present invention. The process of maintaining a security policy starts at step 300. In step 302, one or more practitioners determine a modification to a deployment of an application that employs the plurality of services. Hereinafter, the modification to a deployment of the application is also referred to as an application deployment modification.

Changes required by an application deployment modification are, in some cases, limited to changes to one or two of the three specification sets 106, 108, 110 (see FIG. 1). Since there is a high degree of independence between the specification sets, the limited scope of the change improves overall resilience by focusing verification, and by reducing the occurrence of cascading errors.

Application deployment modification may be necessary for reasons such as:

A change in the network address of a device

Services are redistributed on devices to better balance the system

The number of instantiations of a service changes due to changes in application load In step 304, one or more practitioners determine whether exactly one, exactly two, or all three of the specification sets 106, 108, 110 (see FIG. 1) are affected by the application deployment modification determined in step 302.

If exactly one of the specification sets 106, 108, 110 (see FIG. 1) is determined to be affected by the application deployment modification, then the other specification sets are determined to be unaffected by the application deployment modification. If exactly two of the specification sets 106, 108, 110 (see FIG. 1) are determined to be affected by the application deployment modification, then the other specification set is determined to be unaffected by the application deployment modification.

Table 1 lists examples of types of application deployment modifications and what specification set(s) are affected or unaffected by the type of modification. It should be noted that in all cases in Table 1, and indeed any changes requiring regeneration of the service policy, that if a service specification set is not affected, no further knowledge of the specification set is required, and the practitioner responsible for the specification set need not even be aware of the changes in other specification sets or regeneration of the security policy.

TABLE 1

| Type of Modification | Specification Set Affected? | | |
| --- | --- | --- | --- |
| | Service Flow | Service Placement | Device Address |
| Device network address changes | No; the flow is between the same logical services | No; services are still on the same devices | Yes; device network addresses are changed |
| Services are redistributed on devices | No; the flow is between the same logical services | Yes; services are placed on different devices | No; the number and addresses of devices has not changed |
| Number of service instantiations changes | No; the flow is between the same logical services | Possible; additional service instances are placed on the same number or on a different number of devices, or service instances are deleted | Yes; new devices are introduced or devices are eliminated |
| A new service is added to an existing device | Yes; the new service has new flows | Yes; the new service is placed on a device | No; the device on which the service is placed is an existing device |
| A new flow is added to an existing service on an existing device | Yes; the flow being added is a new flow | No; the service to which the new flow is added is an existing service | No; the device is an existing device |

If exactly one of the specification sets 106, 108, 110 (see FIG. 1) is determined to be affected in step 304, then in step 306 a single practitioner modifies the affected specification set without requiring any knowledge of the unaffected specification sets.

If exactly two of the specification sets 106, 108, 110 (see FIG. 1) are determined to be affected in step 304, then in step 306, practitioner(s) modify the two affected specification sets. In one embodiment, two different practitioners modify the affected specification sets, where each of the two practitioners modifies a respective affected specification set independently of the other practitioner and where the two practitioners do not require knowledge of the unaffected specification set.

If exactly three of the specification sets 106, 108, 110 (see FIG. 1) are determined to be affected in step 304, then in step 306, practitioner(s) modify the three affected specification sets. In one embodiment, three different practitioners modify the affected specification sets, where each of the three practitioners modifies a respective affected specification set independently of the other practitioners.

The modified specification set(s) made in step 306 are based on the application deployment modification determined in step 302. The modified specification set(s), which are known to be correct, are used in the following steps to automatically regenerate packet filtering rules (e.g., firewall rules)

In step 308, security policy creation and maintenance tool 104 (see FIG. 1) receives the specification set(s) modified in step 306.

In step 310, tool 104 (see FIG. 1) combines specification sets 106, 108, 110 (see FIG. 1) by mapping the aforementioned specification sets to packet filtering rule statements.

In step 312, tool 104 (see FIG. 1) automatically updates packet filtering rules (i.e., security policy 112 in FIG. 1) based on the specification sets 106, 108 and 110 (see FIG. 1) combined in step 310 and based on the packet filtering rule statements described above relative to step 310. Each packet filtering rule of the updated packet filtering rules specifies a source network address or a range of source network addresses, a destination network address or a range of destination network addresses, a port or a range of ports, a protocol, and an action, such as permit or deny the sending of a packet from one or more source devices of source device(s) 116-1 . . . 116-M (see FIG. 1) to one or more destination devices of destination device(s) 118-1 . . . 118-N (see FIG. 1) via packet filtering device 114 (see FIG. 1).

In step 314, tool 104 (see FIG. 1) outputs to a computer file the updates to the packet filtering rules as indicated in the updating performed in step 312. In one embodiment, the updates to the packet filtering rules output to the computer file include packet filtering rules added to, deleted from and/or modified in an existing security policy (i.e., a delta set of packet filtering rules), without including unchanged packet filtering rules (i.e., without including the entire security policy). In another embodiment, step 314 includes outputting to the computer file the updated version of the entire security policy, which includes results of the updating performed in step 312 and the packet filtering rules that were unchanged by the updating performed in step 312.

In one embodiment, subsequent to step 314 and prior to step 316, a person (e.g., network specialist) receives the computer file that includes the updated packet filtering rules (e.g., by manually receiving a storage device that stores the computer file or by receiving an email), and subsequently inputs the received computer file to the packet filtering device 114 (see FIG. 1). In another embodiment, subsequent to step 314 and prior to step 316, tool 104 (see FIG. 1) automatically sends the computer file that includes the updated packet filtering rules to packet filtering device 114 (see FIG. 1).

In step 316, packet filtering device 114 (see FIG. 1) receives the updated packet filtering rules and subsequently uses the updated packet filtering rules to filter packets sent by the source device(s) referenced in step 312 to the destination device(s) referenced in step 312.

In one embodiment, security policy creation and maintenance tool 104 (see FIG. 1) generates and presents a notification that includes the packet filtering rules that have changed based on the update in step 312, but does not include the unchanged packet filtering rules. Therefore, the packet filtering rule statements may be generated and updated in step 312 in a way that is incremental by the provision of a delta rules set.

In step 318, the process of maintaining a security policy ends.

In addition to the modifications discussed above, the process of FIG. 3 may include determining in step 302 that another instance of an application is deployed. In this case, the remaining steps of the process of FIG. 3 regenerate the packet filtering rules with no change in the service-to-service connections, thereby demonstrating portability. If changes are made at the location of a first instance of the application, then those changes are carried over to the new instance, thereby demonstrating how the process is repeatable where modifications are preserved. In response to a modification that includes deploying a new instance of an application, the service placement specification set 108 (see FIG. 1) and the device address specification set 110 are affected, as indicated in Table 2.

TABLE 2

| Type of Modification | Specification Set Affected? | | |
| --- | --- | --- | --- |
| | Service Flow | Service Placement | Device Address |
| New Instance of Application | No; the flow is between the same logical services | Yes; services are placed on devices with network addresses that are different from the network addresses of the previous instance | Yes; new devices are introduced |

Further, step 302 may include determining that a service is added to the system. In this case, a practitioner changes the service flow specification set 106 (see FIG. 1) to modify the service flow mapping to incorporate the new service and define how the new service is connected to other services. The same practitioner or another practitioner changes the service placement specification set 108 (see FIG. 1) to indicate a mapping from the new service to a device. If a new device has not been added, then the device address specification set 110 (see FIG. 1) is not changed by the addition of the new service. If a new device is added to handle the new service, then another practitioner, or the same practitioner who changes specification set 106 and/or specification set 108 changes specification set 110 (see FIG. 1). Again, if multiple practitioners make the aforementioned changes to the specification sets, then the multiple practitioners make the necessary changes independently of each other.

Still further, step 302 may include determining that there is a change in how existing services communicate with one another. For example, service A may previously initiate a communication with service B, and after a change, service B now needs to also be able to initiate a communication with service A. In this case, a practitioner changes the service flow specification set 106 (see FIG. 1) to indicate the change in how the services are communicating with each other, but specification sets 108 and 110 (see FIG. 1) are unaffected by the change.

Embodiments of the present invention facilitate reusability. For example, even on dissimilar applications, non-functional and operational network traffic flows are often the same. In these cases, high-level specification sets that specify the non-functional and operational network traffic flows can be reused on subsequent projects.

The high-level network traffic flows may be written in general terms by service, and each control or data flow may be liberally commented. Since the network traffic flows are specified independently of how services are deployed on devices, or how many instances there are, the specifications corresponding to the network traffic flows are easy to read. Further, the network traffic flows have stable definitions because they need not be modified when there are changes in service deployment. Since the network traffic flows are easily read, worded in terms that are familiar to a system designer, and can be liberally commented, the corresponding specification may be self-documenting.

Computer System

Figure 4:
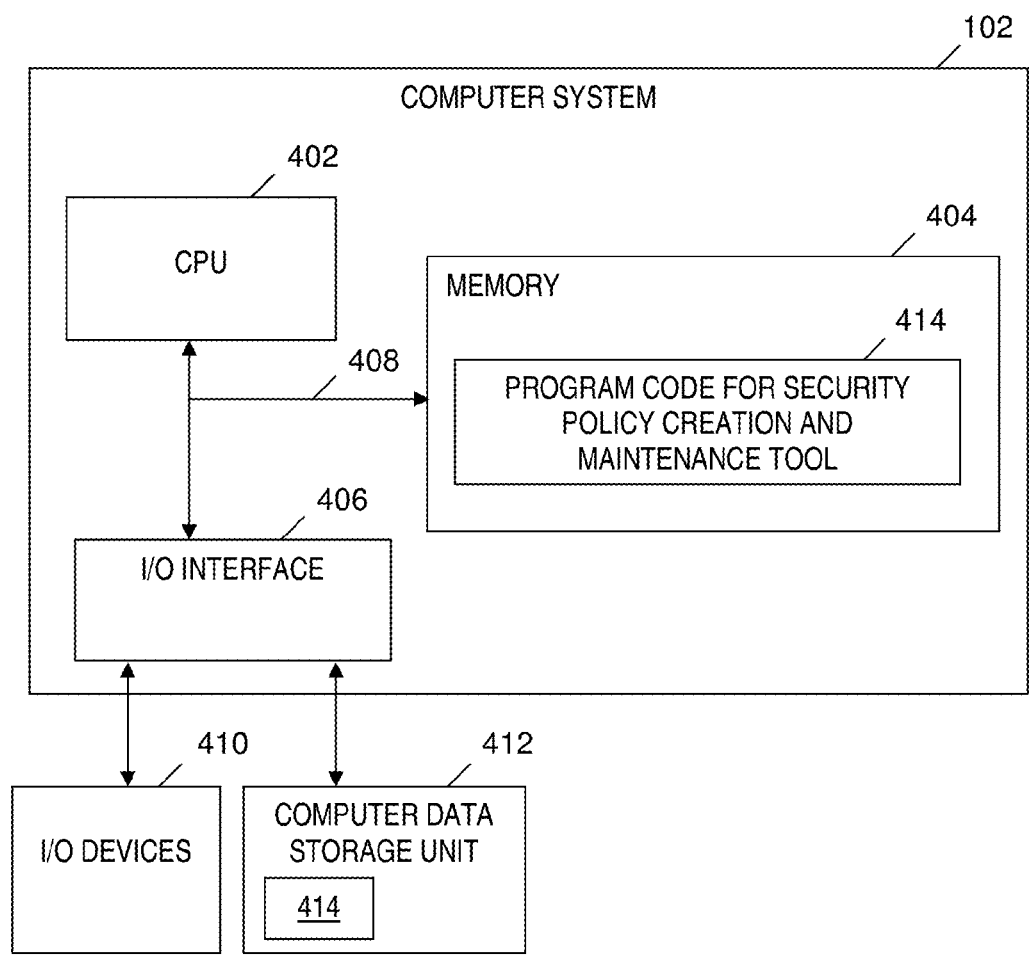
FIG. 4 is a block diagram of a computer system that is included in the system of FIG. 1 and that implements the processes of FIG. 2 and FIG. 3, in accordance with embodiments of the present invention.

FIG. 4 is a block diagram of a computer system that is included in the system of FIG. 1 and that implements the processes of FIG. 2 and FIG. 3, in accordance with embodiments of the present invention. Computer system 102 generally comprises a central processing unit (CPU) 402, a memory 404, an input/output (I/O) interface 406, and a bus 408. Further, computer system 102 is coupled to I/O devices 410 and a computer data storage unit 412. CPU 402 performs computation and control functions of computer system 102, including carrying out instructions included in program code 414 to perform a method of managing a security policy, where the instructions are carried out by CPU 402 via memory 404. CPU 402 may comprise a single processing unit, or be distributed across one or more processing units in one or more locations (e.g., on a client and server).

Memory 404 may comprise any known computer-readable storage medium, which is described below. In one embodiment, cache memory elements of memory 404 provide temporary storage of at least some program code (e.g., program code 414) in order to reduce the number of times code must be retrieved from bulk storage while instructions of the program code are carried out. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 102, and may comprise any type of transmission link, including electrical, optical, wireless, etc.

I/O interface 406 also allows computer system 102 to store information (e.g., data or program instructions such as program code 414) on and retrieve the information from computer data storage unit 412 or another computer data storage unit (not shown). Computer data storage unit 412 may comprise any known computer-readable storage medium, which is described below. For example, computer data storage unit 412 may be a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are carried out by CPU 402 via memory 404 to manage a security policy. Although FIG. 4 depicts memory 404 as including program code 414, the present invention contemplates embodiments in which memory 404 does not include all of code 414 simultaneously, but instead at one time includes only a portion of code 414.

Further, memory 404 may include other systems not shown in FIG. 4, such as an operating system (e.g., Linux) that runs on CPU 402 and provides control of various components within and/or connected to computer system 102.

Storage unit 412 and/or one or more other computer data storage units (not shown) that are coupled to computer system 102 may store specification sets 106, 108, 110 (see FIG. 1) and security policy 112 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module".

Furthermore, an embodiment of the present invention may take the form of a computer program product embodied in one or more computer-readable medium(s) (e.g., memory 404 and/or computer data storage unit 412) having computer-readable program code (e.g., program code 414) embodied or stored thereon.

Any combination of one or more computer-readable mediums (e.g., memory 404 and computer data storage unit 412) may be utilized. The computer-readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 414) for use by or in connection with a system, apparatus, or device for carrying out instructions.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 414) embodied on a computer-readable medium may be transmitted using any appropriate medium, including but not limited to wireless, wireline, optical fiber cable, RF, etc., or any suitable combination of the foregoing.

Computer program code (e.g., program code 414) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 4. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2 and FIG. 3) and/or block diagrams of methods, apparatus (systems) (e.g., FIG. 1 and FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 414). These computer program instructions may be provided to one or more hardware processors (e.g., CPU 402) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 404 or computer data storage unit 412) that can direct a computer (e.g., computer system 102), other programmable data processing apparatus, or other devices to function in a particular manner, such that the instructions (e.g., program 414) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 414) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to managing a security policy. Thus, an embodiment of the present invention discloses a process for supporting computer infrastructure, wherein the process comprises providing at least one support service for at least one of integrating, hosting, maintaining and deploying computer-readable code (e.g., program code 414) in a computer system (e.g., computer system 102) comprising one or more processors (e.g., CPU 402), wherein the processor(s) carry out instructions contained in the code causing the computer system to manage a security policy.

In another embodiment, the invention provides a method that performs the process steps of the invention on a subscription, advertising and/or fee basis. That is, a service provider, such as a Solution Integrator, can offer to create, maintain, support, etc. a process of managing a security policy. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2 and FIG. 3 and the block diagrams in FIG. 1 and FIG. 4 illustrate the architecture, functionality, and operation of possible implementations of systems, methods, and computer program products according to various embodiments of the present invention. In this regard, each block in the flowchart or block diagrams may represent a module, segment, or portion of code (e.g., program code 414), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a security policy, said method comprising:

a computer receiving specification sets consisting of first, second, and third specification sets, said first specification set specifying service flows as a first mapping of each service of a first set of services to a corresponding service of a second set of services based on each service of said first set of services requiring communication with said corresponding service of said second set of services, wherein said first and second sets of services are included in a plurality of services, said second specification set specifying a second mapping of each service of said plurality services to one or more corresponding devices of a plurality of devices, and said third specification set specifying a third mapping of each device of said plurality of devices to one or more network addresses;

said computer combining said received first, second and third specification sets by mapping said first, second and third specification sets to a plurality of packet filtering rule statements;
a processor of said computer generating said security policy as a plurality of packet filtering rules based on said combined first, second and third specification sets and said plurality of packet filtering rule statements, wherein each packet filtering rule of said plurality of packet filtering rules specifies a corresponding source network address or range of source network addresses, a corresponding destination network address or range of destination network addresses, a corresponding port or range of ports, a corresponding protocol and a corresponding action;
based on a determination of an addition of a new service flow to said service flows, a determination that said first specification set is affected by said addition of said new service flow, and a determination that said second and third specification sets are unaffected by said addition of said new service flow, said computer receiving a modification of said first specification set which includes a mapping of a first service to a second service, but no modification of said second and third specification sets, so that an error included in said modification of said first specification set is not cascaded into said second specification set or said third specification set;
subsequent to a correction of said error and based on said first specification set being modified but said second and third specification sets being not modified, said computer modifying at least one packet filtering rule, but not all packet filtering rules, included in said plurality of packet filtering rules, which leaves at least one other packet filtering rule of said plurality of packet filtering rules unchanged;
said computer generating a delta set that indicates said modified at least one packet filtering rule, wherein said delta set does not indicate said at least one other packet filtering rule left unchanged by said modifying said at least one packet filtering rule;
said computer outputting said delta set to a computer file so that said computer file includes said modified at least one packet filtering rule and so that said computer file does not include said at least one other packet filtering rule left unchanged by said modifying said at least one packet filtering rule; and
said computer incrementally updating said security policy by sending said computer file to a packet filtering device so that said packet filtering device receives said modified at least one packet filtering rule but not said at least one other packet filtering rule left unchanged.

2. The method of claim 1, further comprising:
subsequent to said incrementally updating and based on a determination of a change in a network address of a device of said plurality of devices, a determination that said third specification set is affected by said change in said network address of said device, and a determination that said first and second specification sets are unaffected by said change in said network address of said device, said computer receiving a modification of said third specification set which includes a mapping of one or more devices of said plurality of devices to a corresponding one or more other network addresses, so that an error included in said modification of said third specification set is not cascaded into said first specification set or said second specification set;
said computer combining said modification of said third specification set and said first and second specification sets by mapping said received modification of said third specification set with said first and second specification sets to an update of said plurality of packet filtering rule statements; and
said computer updating said plurality of packet filtering rules based on said update of said plurality of packet filtering rule statements.

3. The method of claim 1, further comprising:
subsequent to said incrementally updating and based on a determination of a redistribution of a service of said plurality of services to another device of said plurality of devices, a determination that said second specification set is affected by said redistribution of said service to said another device, and a determination that said first and third specification sets are unaffected by said redistribution of said service to said another device, said computer receiving a modification of said second specification set which includes a mapping of said service to said another device, so that an error included in said modification of said second specification set is not cascaded into said first specification set or said third specification set;
said computer combining said modification of said second specification set and said first and third specification sets by mapping said received modification of said second specification set with said first and third specification sets to an update of said plurality of packet filtering rule statements; and
said computer updating said plurality of packet filtering rules based on said update of said plurality of packet filtering rule statements.

4. A computer program product, comprising a computer-readable, tangible storage device having a computer-readable program code stored in the computer-readable storage device, said computer-readable program code containing instructions that are carried out by a central processing unit (CPU) of a computer system to implement a method of managing a security policy, said method comprising:
said computer system receiving specification sets consisting of first, second, and third specification sets, said first specification set specifying service flows as a first mapping of each service of a first set of services to a corresponding service of a second set of services based on each service of said first set of services requiring communication with said corresponding service of said second set of services, wherein said first and second sets of services are included in a plurality of services, said second specification set specifying a second mapping of each service of said plurality services to one or more corresponding devices of a plurality of devices, and said third specification set specifying a third mapping of each device of said plurality of devices to one or more network addresses;
said computer system combining said received first, second and third specification sets by mapping said first, second and third specification sets to a plurality of packet filtering rule statements;
said CPU of said computer system generating said security policy as a plurality of packet filtering rules based on said combined first, second and third specification sets and said plurality of packet filtering rule statements, wherein each packet filtering rule of said plurality of packet filtering rules specifies a corresponding source network address or range of source network addresses, a corresponding destination network address or range of destination network addresses, a corresponding port or range of ports, a corresponding protocol and a corresponding action;

based on a determination of an addition of a new service flow to said service flows, a determination that said first specification set is affected by said addition of said new service flow, and a determination that said second and third specification sets are unaffected by said addition of said new service flow, said computer receiving a modification of said first specification set which includes a mapping of a first service to a second service, but no modification of said second and third specification sets, so that an error included in said modification of said first specification set is not cascaded into said second specification set or said third specification set;

subsequent to a correction of said error and based on said first specification set being modified but said second and third specification sets being not modified, said computer modifying at least one packet filtering rule, but not all packet filtering rules, included in said plurality of packet filtering rules, which leaves at least one other packet filtering rule of said plurality of packet filtering rules unchanged;

said computer generating a delta set that indicates said modified at least one packet filtering rule, wherein said delta set does not indicate said at least one other packet filtering rule left unchanged by said modifying said at least one packet filtering rule;

said computer outputting said delta set to a computer file so that said computer file includes said modified at least one packet filtering rule and so that said computer file does not include said at least one other packet filtering rule left unchanged by said modifying said at least one packet filtering rule; and said computer incrementally updating said security policy by sending said computer file to a packet filtering device so that said packet filtering device receives said modified at least one packet filtering rule but not said at least one other packet filtering rule left unchanged.

5. The program product of claim 4, wherein said method further comprises:

subsequent to said incrementally updating and based on a determination of a change in a network address of a device of said plurality of devices, a determination that said third specification set is affected by said change in said network address of said device, and a determination that said first and second specification sets are unaffected by said change in said network address of said device, said computer system receiving a modification of said third specification set which includes a mapping of one or more devices of said plurality of devices to a corresponding one or more other network addresses, so that an error included in said modification of said third specification set is not cascaded into said first specification set or said second specification set;

said computer system combining said modification of said third specification set and said first and second specification sets by mapping said received modification of said third specification set with said first and second specification sets to an update of said plurality of packet filtering rule statements; and said computer system updating said plurality of packet filtering rules based on said update of said plurality of packet filtering rule statements.

6. The program product of claim 4, wherein said method further comprises:

subsequent to said incrementally updating and based on a determination of a redistribution of a service of said plurality of services to another device of said plurality of devices, a determination that said second specification set is affected by said redistribution of said service to said another device, and a determination that said first and third specification sets are unaffected by said redistribution of said service to said another device, said computer system receiving a modification of said second specification set which includes a mapping of said service to said another device, so that an error included in said modification of said second specification set is not cascaded into said first specification set or said third specification set;

said computer system combining said modification of said second specification set and said first and third specification sets by mapping said received modification of said second specification set with said first and third specification sets to an update of said plurality of packet filtering rule statements; and said computer system updating said plurality of packet filtering rules based on said update of said plurality of packet filtering rule statements.

7. A computer system comprising:

a central processing unit (CPU);

a memory coupled to said CPU;

a computer-readable, tangible storage device coupled to said CPU, said storage device containing instructions that are carried out by said CPU via said memory to implement a method of managing a security policy, said method comprising:

said computer system receiving specification sets consisting of first, second, and third specification set, said first specification set specifying service flows as a first mapping of each service of a first set of services to a corresponding service of a second set of services based on each service of said first set of services requiring communication with said corresponding service of said second set of services, wherein said first and second sets of services are included in a plurality of services, said second specification set specifying a second mapping of each service of said plurality services to one or more corresponding devices of a plurality of devices, and said third specification set specifying a third mapping of each device of said plurality of devices to one or more network addresses;

said computer system combining said received first, second and third specification sets by mapping said first, second and third specification sets to a plurality of packet filtering rule statements;

said CPU of said computer system generating said security policy as a plurality of packet filtering rules based on said combined first, second and third specification sets and said plurality of packet filtering rule statements, wherein each packet filtering rule of said plurality of packet filtering rules specifies a corresponding source network address or range of source network addresses, a corresponding destination network address or range of destination network addresses, a corresponding port or range of ports, a corresponding protocol and a corresponding action;

based on a determination of an addition of a new service flow to said service flows, a determination that said first specification set is affected by said addition of said new service flow, and a determination that said second and third specification sets are unaffected by said addition of said new service flow, said computer system receiving a modification of said first specification set which includes a mapping of a first service to a second service, but no modification of said second and third specification sets, so that an error included in said modification of said first specification set is not cascaded into said second specification set or said third specification set;

subsequent to a correction of said error and based on said first specification set being modified but said second and third specification sets being not modified, said computer system modifying at least one packet filtering rule, but not all packet filtering rules, included in said plurality of packet filtering rules, which leaves at least one other packet filtering rule of said plurality of packet filtering rules unchanged;

said computer system generating a delta set that indicates said modified at least one packet filtering rule, wherein said delta set does not indicate said at least one other packet filtering rule left unchanged by said modifying said at least one packet filtering rule;

said computer system outputting said delta set to a computer system file so that said computer system file includes said modified at least one packet filtering rule and so that said computer system file does not include said at least one other packet filtering rule left unchanged by said modifying said at least one packet filtering rule; and said computer system incrementally updating said security policy by sending said computer system file to a packet filtering device so that said packet filtering device receives said modified at least one packet filtering rule but not said at least one other packet filtering rule left unchanged.

8. The computer system of claim 7, wherein said method further comprises:

subsequent to said incrementally updating and based on a determination of a change in a network address of a device of said plurality of devices, a determination that said third specification set is affected by said change in said network address of said device, and a determination that said first and second specification sets are unaffected by said change in said network address of said device, said computer system receiving a modification of said third specification set which includes a mapping of one or more devices of said plurality of devices to a corresponding one or more other network addresses, so that an error included in said modification of said third specification set is not cascaded into said first specification set or said second specification set;

said computer system combining said modification of said third specification set and said first and second specification sets by mapping said received modification of said third specification set with said first and second specification sets to an update of said plurality of packet filtering rule statements; and said computer system updating said plurality of packet filtering rules based on said update of said plurality of packet filtering rule statements.

9. The computer system of claim 7, wherein said method further comprises:

subsequent to said incrementally updating and based on a determination of a redistribution of a service of said plurality of services to another device of said plurality of devices, a determination that said second specification set is affected by said redistribution of said service to said another device, and a determination that said first and third specification sets are unaffected by said redistribution of said service to said another device, said computer system receiving a modification of said second specification set which includes a mapping of said service to said another device, so that an error included in said modification of said second specification set is not cascaded into said first specification set or said third specification set;

said computer system combining said modification of said second specification set and said first and third specification sets by mapping said received modification of said second specification set with said first and third specification sets to an update of said plurality of packet filtering rule statements; and said computer system updating said plurality of packet filtering rules based on said update of said plurality of packet filtering rule statements.

\* \* \* \* \*